Feb. 7, 1967     M. D. SCADRON     3,302,458
LIQUID LEVEL SENSING DEVICE
Filed Oct. 9, 1963     2 Sheets-Sheet 1
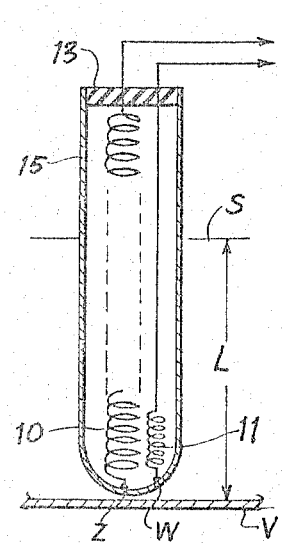
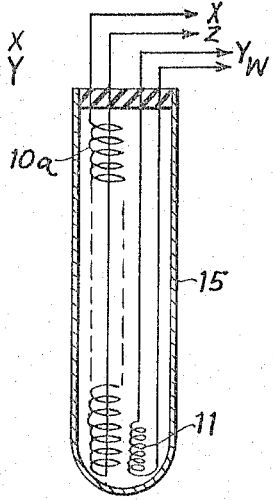
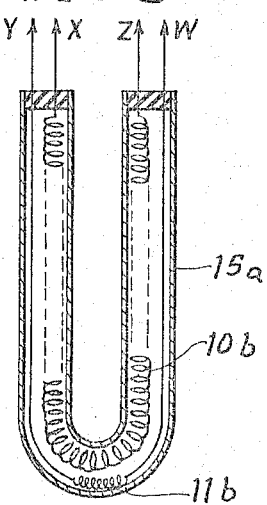
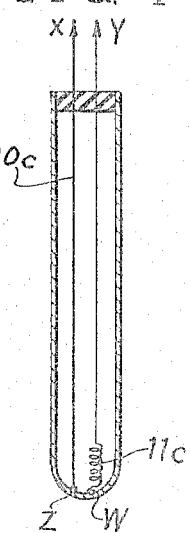
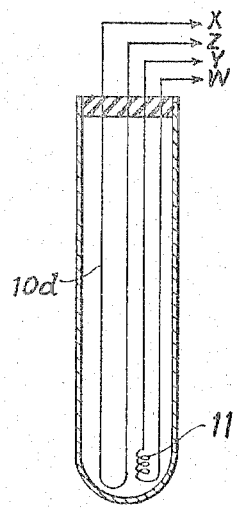
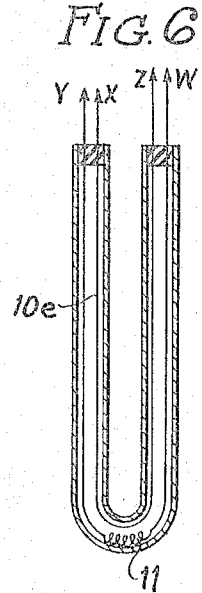
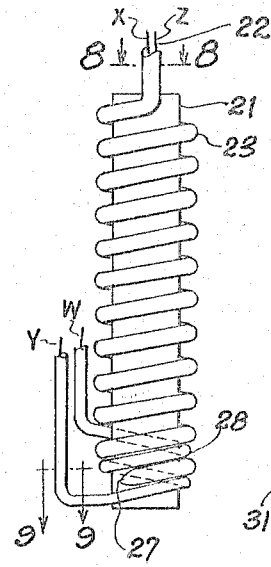
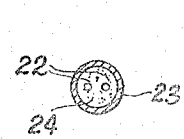
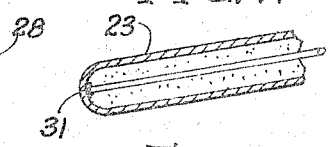
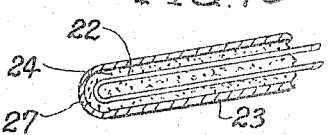
INVENTOR.
Marvin D. Scadron
BY Leonard S. Knox
Atty Feb. 7, 1967 — M. D. SCADRON — 3,302,458
LIQUID LEVEL SENSING DEVICE
Filed Oct. 9, 1963 — 2 Sheets-Sheet 2

INVENTOR.
Marvin D. Scadron
BY
Atty

United States Patent Office 3,302,458
Patented Feb. 7, 1967

3,302,458
LIQUID LEVEL SENSING DEVICE
Marvin D. Scadron, Skokie, Ill., assignor to American Radiator & Standard Sanitary Corporation, New York, N.Y., a corporation of Delaware
Filed Oct. 9, 1963, Ser. No. 314,956
9 Claims. (Cl. 73—295)

This invention relates to devices for translating the instantaneous level, i.e., depth, of a liquid into an electrical signal for application to indicating or other apparatus adapted to provide a useful output dependent on such level.

The objects of the invention are to provide a device as aforesaid of the passive type, i.e., not incorporating mechanical action as the liquid level varies; which is simple and rugged; which is insensitive to changes in the temperature of the liquid notwithstanding the use of a heated compensator in the device; which is extremely versatile in its application; which is highly reproducible on the production line; which has very fast response and which is inexpensive to manufacture and install.

Other objects and advantages of the invention will become apparent from the ensuing description which, taken with the accompanying drawings, discloses certain preferred forms which the invention may assume in practice.

In these drawings:

FIG. 1 shows a device according to the invention in which the main resistance element and compensating element are both helical and commonly grounded on the metallic housing;

FIG. 2 is similar to FIG. 1 except that each element is on an individual circuit;

FIG. 3 is similar to FIG. 2 except that the main element is U-shaped and contained in a U-shaped housing, and the compensating element is adjacent the bight of the U;

FIG. 4 is similar to FIG. 1, except that the main element is a straight wire;

FIG. 5 is similar to FIG. 4 except that the main element is hairpin-shaped;

FIG. 6 is similar to FIG. 3 except that the main element is U-shaped but not helically wound;

FIG. 7 is similar to FIG. 2 except that the main element is a resistance wire contained in a sheath which is helically-wound on a support, and the compensating element is also helical and positioned closely adjacent the main element;

FIG. 8 is a cross section taken on the line 8—8 of FIG. 7;

FIG. 9 is a cross section taken on the line 9—9 of FIG. 7;

FIG. 10 is a detail in longitudinal section of the lower terminus of the main element of FIG. 7;

FIG. 11 is similar to FIG. 10, but of the modified form of the main element of FIG. 7;

It has been known to sense the depth of a liquid by utilizing an electrical conductor having some fixed value of resistance at some reference temperature in air, and to position the conductor with its longitudinal axis perpendicular to the surface of the liquid. The length of the conductor is chosen so that some portion or all is immersed when the body of fluid attains its maximum depth and, therefore, as the level falls a progressively greater portion of the conductor becomes exposed to ambient air. Since the rate of exchange of heat between the fluid and conductor and between the air and conductor will be different for each different level, it is possible to measure such variations in their relation to the resistance of the whole conductor and to utilize such measure to provide a reading of the liquid level. By heating the conductor and establishing a stabilization therefor at some chosen level of liquid, any change in level produces a sharp change in temperature as the liquid covers or uncovers the conductor.

Another passive apparatus analogous to the foregoing is disclosed in the co-pending application of Otto J. Cousins et al., Serial No. 283,346, filed May 27, 1963, and owned by the assignee of the instant application.

In accordance with the present invention, a metallic wire, main element, having a high temperature coefficient of resistance is assembled in a suitable housing with a compensating element having the same coefficient and the assembly is immersed in the liquid. The metallic wire is energized to cause a general heating up and the output is read on an ohmmeter or fed to apparatus capable of utilizing the output. As the level varies, the resistance of the immersed portion of the wire varies proportionately. The change in resistance is not linear with depth, but by proper proportioning and sizing, the unit can be made sensitive and/or linear in the range desired.

Prior devices of the types referred to and other types dependent upon variation of resistance of a sensing element are somewhat sensitive to changes in the respective temperatures of the liquid and ambient air. I have found that by using an immersed compensating element which is not heated, as disclosed herein, this shortcoming can be considerably alleviated.

Figure 13:
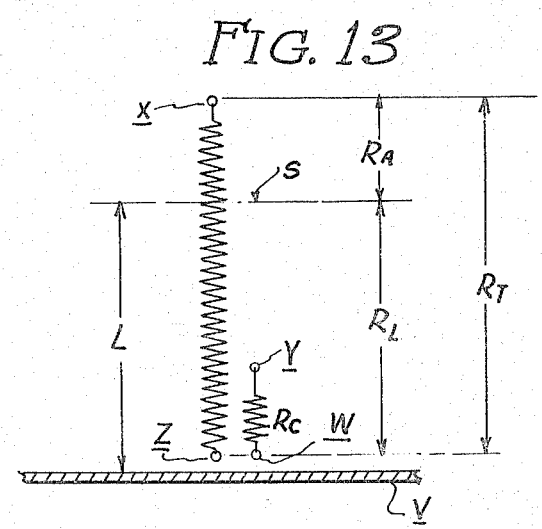
FIG. 13 is a circuit diagram applicable to the various forms heretofore described.

The broad nature of the invention can best be elucidated by considering the following analysis, initial reference being made to FIG. 13.

The body of liquid whose level is to be sensed is contained in a vessel V, and has a top surface S at a distance L from the bottom of the vessel. Hence, L represents the measure of the depth of the liquid in some recognized unit of length.

A main element of metallic wire having a high value of temperature coefficient of resistance and a compensating element having the same coefficient, and constructed, arranged and housed as disclosed hereinafter, constitute the essential features of the invention device. Typical materials having the desirable coefficient are "Hytempco," available from Driver-Harris Co., Harrison, New Jersey, or "Balco," available from Wilbur Driver Co., Newark, New Jersey. These are essentially alloys of nickel and iron. However, nickel, iron, tungsten or platinum alone or alloys thereof, other than those referred to by their trademarks, may also be used. The dimensions and position of each element are selected so as to insure that some portion of the length of the main element is immersed at the lowest expected value of L, and that all or substantially all of such length is immersed at the highest expected value of L. The compensating element is arranged to be immersed at all times. The main element is supplied with some value of current to be heated to some suitable temperature. Such source of current is not shown in FIGS. 13 or 14 but will be understood as being applied in parallel across the points X and Z. Moreover, the compensating element will be of some sufficiently large diameter of wire so as not to be self-heating.

The main element may be straight, helical or of other form and is indicated as $R_I$, and the compensating element, which may be of any suitable form, but is preferably helical in order to conserve space, is indicated as $R_C$. The respective ends of $R_T$ are indicated as X and Z, and the respective ends of $R_C$ are indicated as Y and W.

The lower end Z in the physical embodiment is positioned sufficiently close to the bottom of the vessel V so that, assuming uniformity over the whole length of $R_T$, $R_L$ (the immersed portion of $R_T$) may be regarded as directly proportional to L. The portion of $R_T$ exposed above S is indicated as $R_A$. The entire $R_C$ is positioned closely adjacent $R_L$, and sufficiently close to the bottom of the vessel V as to ensure its complete immersion at the lowest expected value of L.

As one exemplificative form of apparatus for reading the varying value $R_T$ and comparing the same with $R_C$, a Wheatstone-type of bridge has been illustrated—$R_T$ and $R_C$ being in adjacent legs and resistors $R_1$ and $R_2$ in the other pair of adjacent legs. Either or both $R_1$ and $R_2$ may be rendered adjustable, in accordance with known practice. An input or source voltage is shown at E and the output voltage at $e$, this latter being the alegbraic difference between $e_1$ and $e_2$. If the output is designed so as to draw virtually no current then the current through $R_1$ and $R_2$ may be shown as $I_1$, and the current through $R_T$ and $R_C$ may be shown as $I_2$.

Figure 14:
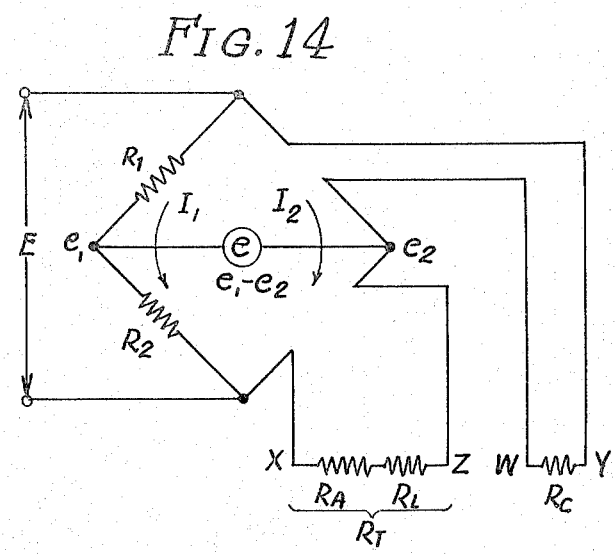
FIG. 14 is a circuit diagram illustrating one mode of utilizing the potential derived from the device, and to be considered with certain mathematical steps hereinafter set forth.

Having the foregoing considerations in view and referring to FIG. 14, we may write:

$$R_T = R_A + R_L \qquad (1)$$
$$e_1 = E - I_1 R_1 \qquad (2)$$
$$I_1 = \frac{E}{R_1 + R_1} \qquad (3)$$

Substituting (3) in (2) and factoring:

$$e_1 = E\left(1 - \frac{R_1}{R_1 + R_2}\right) \qquad (4)$$
$$e_2 = E - I_2 R_C \qquad (5)$$
$$I_2 = \frac{E}{R_C + R_A + L} \qquad (6)$$

substituting (6) in (5) and factoring:

$$e_2 = E\left(1 - \frac{R_C}{R_C + R_A + R_L}\right) \qquad (7)$$
$$e_1 - e_2 = E\left(1 - \frac{R_1}{R_1 + R_2} - 1 + \frac{R_C}{R_C + R_A + R_L}\right) \qquad (8)$$
$$= E\left(\frac{1}{1 + \frac{R_A + R_L}{R_C}} - \frac{1}{1 + \frac{R_2}{R_1}}\right) \qquad (9)$$

and we may also write:

$$R_L = R_{LO}[1 + \alpha(t_{LO} - t_L)] \qquad (10)$$

where $R$ = resistance of the immersed portion before immersion (reference temperature);
$\alpha$ = temperature coefficient of resistance (assumed constant for the present analysis);
$t_{LO}$ = temperature of the immersed portion before immersion (reference temperature);
$t_L$ = temperature of the immersed portion after immersion.

Since, as stated above, $R_C$ has the same value of $\alpha$ as does $R_A$ and $R_L$, and is constituted of larger diameter wire in order not to be self-heating, its resistance is solely a function of liquid temperature. Therefore, $$R_C = R_{CO}[1 + \alpha(t_{CO} - t_L)] \qquad (11)$$

where $R_{CO}$ = resistance of $R_C$ at the temperature $t_{CO} = t_{LO}$
$t_{CO}$ = temperature of the immersed $R_C$ (reference temperature)

and $t_L$ = temperature of the immersed $R_C$

Since $R_1$ and $R_2$ are fixed resistors $$\frac{1}{1 + \frac{R_2}{R_1}} = k \qquad (12)$$

substituting (10), (11) and (12) in (9)

$$e_1 - e_2 = E\left(\frac{1}{1 + \frac{R_A + R_{LO}[1 + \alpha(t_{LO} - t_L)]}{R_{CO}[1 + \alpha(t_{LO} - t_L)]}}\right) \qquad (13)$$

Since $R_L = f(L, t_L)$ then $$R_{LO} = f(L) \qquad (14)$$
$$R_{CO} = K, \text{ (by hypothesis)} \qquad (15)$$
$$R_A = f(L) \qquad (16)$$

assuming that ambient temperature has a negligible effect and $$t_{LO} - t_L = f(L) \qquad (17)$$

Therefore, by virtue of $$e_1 - e_2 = E\left(\frac{1}{1 + \frac{f(L) + f(L) \cdot f(L)}{K \cdot f(L)}} - k\right)$$

Thus, with E constant, the output $e$ of the bridge will be a function of L.

As will have become apparent from the foregoing analysis, the compensating element compensates for variation in the temperature of the fluid. Basically, the resistance $R_A$ of the exposed portion of the main element is a function of the temperature of the ambient air above the level S. To assume that this ambient temperature is constant is not absolutely valid but since, in the general case, it is reasonably constant, the analysis proceeds on this assumption. Similarly, the resistance $R_L$ varies proportionally with L and, therefore, assuming that the body of liquid has some instantaneous temperature $t_L$, the differential exchange of heat between $R_A$ and ambient air and between $R_L$ and the body of liquid is evidenced as potential changes in the two right-hand legs of the bridge and corresponding values of $e$.

If the relation between L (ordinate) and $e$ (abscissa) is plotted, the curve will have a relatively linear portion beginning essentially at the origin, and will break at a knee. The portion of the curve below the knee represents the practical useful relation or working region and, by suitable choice of parameters, may be made to cover a wide range of applications.

In carrying the principles expressed in the foregoing analysis into practice, various possible forms are presented, some of which are illustrated in FIGS. 1 to 13 and which will now be described.

Thus, referring to FIG. 1, the main element is shown at 10 as a helically-wound resistance wire having a high value of temperature coefficient of resistance $\alpha$, e.g. those metals and alloys heretofore mentioned. The compensating element 11 is also shown as a helically-wound resistance wire having the same value of $\alpha$ as the element 10, occupying a small region near the bottom of the vessel and closely adjacent the main element. Both elements are contained in a metallic housing 15, and are supported and electrically insulated from each other and the casing by any suitable means, e.g., powdered magnesium oxide compacted about the elements while these latter are held properly located. It will be apparent that there is also provided some means (not shown) for supporting the housing or sheaths relative to the vessel containing the body of liquid. In the example of FIG. 1, the terminals Z and W may be connected in common by soldering or welding the same to the housing as shown, or uniting the two directly. The ends X and Y are brought out through a suitable insulating head on the housing, shown diagrammatically at 13. It will have become obvious, from the preceding description, that the upper end of the element 10 shall be at substantially the upper limit of the surface S.

FIG. 2 is an alternative embodiment similar to FIG. 1 except that the ends X, Z, Y and W of the main and compensating elements 10a and 11 respectively, are all brought to the exterior of the housing.

In FIG. 3, a further modification is shown in which the main element 10b is a helically-wound wire formed, as an entirety, into a U-shape, and the compensating element 11b is positioned to be closely adjacent the bottom of the vessel. Consequently, the housing 15a is of U-shape and the element 11b is at the bottom thereof.

The form of device depicted in FIG. 4 is similar to that of FIG. 1 except that the main element 10c is a straight wire, while the compensating element 11c is as before.

FIG. 5 shows another alternative in which the main element 10d is a wire bent into hairpin form while the compensating element is as before.

The modification of FIG. 6 may be compared to FIG. 3 except that the main element 10e is a wire of simple U-form, whereas the compensating element 11 is as before.

Those forms of the invention shown in FIGS. 1 to 6 are characterized by the common feature of enclosing the elements in a housing, together with means to support and insulate the same, for example, through the medium of a matrix of compacted magnesium oxide or other refractory material as heretofore mentioned. Alternatively, the resistance elements may comprise any of the basic forms described, each received in a metallic tubular sheath and suitably insulated by compacting powdered magnesium oxide in the sheath, or by threading the elements through refractory pellets received in a sheath. Such sheathed elements are well-known and therefore do not justify elaboration. They may be provided with terminals of practically any form for connecting the same to the exterior circuit.

As examples of modes in which elements of the foregoing type may be utilized in practicing the invention, reference is made to FIGS. 7 to 12. In FIG. 7 a cylindrical support 21 of any suitable material is provided and may consist of a simple tube or rod together with means for supporting the same with respect to the vessel in which the liquid is contained. In this figure, the main element 22 is of hairpin form contained in a sheath 23, together with a refractory 24, as described. The sheath 23 is somewhat malleable and therefore may be wound on the support 21 as a helix, the lower end 27 being closed by welding or equivalent expedient, as is recognized in this art. It will be understood that the main element, as so constituted, is somewhat similar to the element 10d, except for its helical configuration.

The compensating element 28 may be constituted similarly to the element 23 but, as a further variation, the same has the resistance wire as a single lay emerging at the ends of the sheath and identified as Y and W. FIG. 8 is a transverse cross section to show the wire 22 in its relation to the sheath 23 and insulation 24. By intercalating the helical elements, as shown, the compensating element may be carried directly on the support 21.

FIG. 9 is a cross section taken on the line 9—9 to show the disposition of the single lay of wire relative to the sheath, as in FIG. 7.

If desired, the hairpin-shaped wire of FIG. 10 may be replaced by a single lay of wire with the inner end 31 grounded to the sheath (FIG. 11), and the leads taken from the sheath and the other end of the wire respectively.

Figure 12:
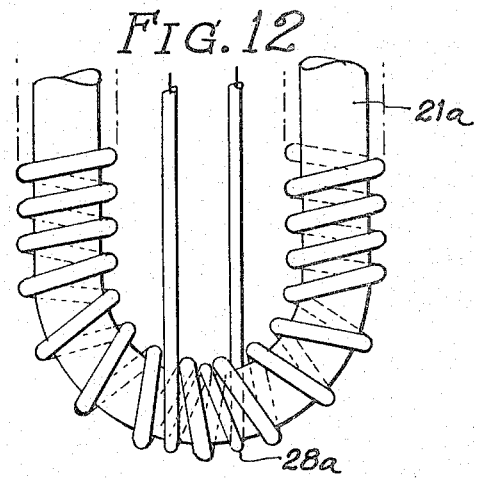
FIG. 12 is still another modification which incorporates certain features of FIGS. 3 and 7.

That form of the invention shown in FIG. 12 is similar to FIG. 7, except that the support 21a is U-shaped. The compensating element 28a is positioned at the bight of the U and intercalated with the main element.

In connection with FIG. 7 and FIG. 12, it is within contemplation to wind the compensating element over the main element or the main element over the compensator element, rather than to intercalate the several turns.

It will have become evident from the preceding exposition that the device is an improvement over prior devices intended for the same purpose in that variation in the temperature of the liquid is counterbalanced by the effect of the compensating element. Such prior devices yielded erroneous indications of level whenever the temperature of the liquid varied from an established norm for which the apparatus was calibrated. The instant device functions independently of variation in the temperature of the liquid, so that, once the bridge or other output circuitry is calibrated for the average temperature of the liquid, no further adjustment is dictated.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. Apparatus for translating the instantaneous depth of a body of liquid of varying level into an electrical potential to provide a measure of such depth comprising: an elongated, main, electrically-conductive element having a comparatively high temperature coefficient of resistance, said element being positioned with the axis of the element perpendicular to the surface of the liquid to be immersed in varying degree as the liquid level rises and falls, the element having an overall length substantially equal to the expected maximum depth of the body of liquid, a source of current connected to said element to heat the same, a compensating element characterized by substantially the same temperature coefficient of resistance as said main element positioned adjacent the bottom of the body of liquid, said compensating element having a size and location insuring immersion thereof at the lowest expected level of the liquid, means to support said elements, electrical means to compare the variations in resistance of the main and compensating elements as effected by variations in the level of the body of liquid and to provide a varying electrical potential proportion at each instant to said level.

2. The combination in accordance with claim 1 wherein the comparing means comprises a resistance bridge, a source of current connected across two opposite corners of the bridge, two adjacent arms including respective balancing resistors, the main element and the compensating element being respectively in the other two adjacent arms of the bridge, and means connected across the other opposite corners of the bridge to utilize the output voltage.

3. The combination in accordance with claim 1 further characterized in that said supporting means is a housing containing said elements.

4. The combination in accordance with claim 1 in which said main and compensating elements each comprise at least one conductor, a metallic sheath enclosing each said conductor, electrical insulation intermediate the conductor and sheath, said elements being carried on said supporting means.

5. The combination in accordance with claim 4 in which said elements are helically-wound with the respective sheaths juxtoposed.

6. The combination in accordance with claim 5 in which the turns of the respective helices are intercalated.

7. The combination in accordance with claim 4 in which said supporting means is U-shaped, the main element is helically-wound on the legs and bight thereof, and the compensating element is helically-wound on the bight thereof in juxtaposition with the main element.

8. The combination in accordance with claim 7 in which the turns of the compensating element are intercalated with the turns of the main element.

9. Apparatus for translating the instantaneous depth of a body of liquid of varying level into an electrical potential to provide a measure of such depth comprising: a main, electrically-conductive element having a comparatively high temperature coefficient of resistance adapted to be immersed in the liquid, said element being characterized by having a change in resistance substantially linearly proportional to the depth of the liquid as such depth varies, the length of said element being substantially coextensive with the expected maximum depth of the liquid a source of current connected to said element to heat the same, a compensating element characterized by substantially the same temperature coefficient of resistance as said main element positioned adjacent the bottom of the body of liquid, said compensating element having a size and location insuring immersion thereof at the lowest expected level of the liquid, electrical means to compare the variations in resistance of the main and compensating elements as effected by the variations in the level of the body of liquid and to provide a varying electrical potential proportional at each instant to said level.

References Cited by the Examiner

UNITED STATES PATENTS

| | | |
|---|---|---|
| 2,106,756 | 2/1938 | Obermaier. |
| 2,394,885 | 2/1946 | Boad. |
| 2,456,617 | 12/1948 | Burch _____ 73—295 |

FOREIGN PATENTS

| | | |
|---|---|---|
| 1,063,493 | 8/1959 | Germany. |
| 513,427 | 10/1939 | Great Britain. |

LOUIS R. PRINCE, *Primary Examiner.*

S. C. SWISHER, *Assistant Examiner.*